United States Patent
Oogai

(10) Patent No.: US 8,850,117 B2
(45) Date of Patent: Sep. 30, 2014

(54) STORAGE APPARATUS AND METHOD MAINTAINING AT LEAST AN ORDER OF WRITING DATA

(75) Inventor: Naruhiro Oogai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 573 days.

(21) Appl. No.: 12/722,770

(22) Filed: Mar. 12, 2010

(65) Prior Publication Data

US 2010/0241817 A1    Sep. 23, 2010

(30) Foreign Application Priority Data

Mar. 18, 2009 (JP) ................. 2009-65340

(51) Int. Cl.
     *G06F 12/00*      (2006.01)
     *G06F 11/20*      (2006.01)
     *G06F 12/08*      (2006.01)
     *G06F 11/07*      (2006.01)
     *G06F 3/06*      (2006.01)

(52) U.S. Cl.
     CPC ...... *G06F 12/0866* (2013.01); *G06F 2212/262* (2013.01); *G06F 2212/283* (2013.01); *G06F 11/2058* (2013.01); *G06F 11/2074* (2013.01); *G06F 11/0751* (2013.01); *G06F 3/0656* (2013.01); *G06F 11/0727* (2013.01)
     USPC .......................................... 711/118; 711/162

(58) Field of Classification Search
None
See application file for complete search history.

(56) References Cited

U.S. PATENT DOCUMENTS

| | | | |
|---|---|---|---|
| 7,865,613 B2 * | 1/2011 | Lerner | 709/240 |
| 2003/0167378 A1 * | 9/2003 | Suetake | 711/118 |
| 2005/0080874 A1 * | 4/2005 | Fujiwara et al. | 709/217 |
| 2005/0198411 A1 * | 9/2005 | Bakke et al. | 710/22 |
| 2006/0218368 A1 * | 9/2006 | Satoyama et al. | 711/170 |
| 2007/0033355 A1 * | 2/2007 | Maki et al. | 711/162 |
| 2008/0114952 A1 * | 5/2008 | Ganong et al. | 711/162 |

FOREIGN PATENT DOCUMENTS

JP      2005-122235      5/2005

\* cited by examiner

*Primary Examiner* — Alford W. Kindred
*Assistant Examiner* — Daniel Tsui
(74) *Attorney, Agent, or Firm* — Staas & Halsey LLP

(57) ABSTRACT

A storage system includes a plurality of storage devices connected together, where the plurality of storage devices include a copy-source storage device having data to be copied and copy-target storage devices capable of receiving the copied data. The copy-source storage device includes a copy-source controller for checking parameters contained in a buffer newly setting command to determine a group of storage devices to be subjected to a newly setting of a buffer and a copy-target storage device in the group and transmitting the parameters to the specified copy-target storage device. The copy-target storage device includes a copy-target controller for performing a buffer newly setting process in the specified copy-target storage device on the basis of the parameters received from the copy-source storage device and notifying the copy-source storage device of a result of the buffer newly setting process.

9 Claims, 13 Drawing Sheets

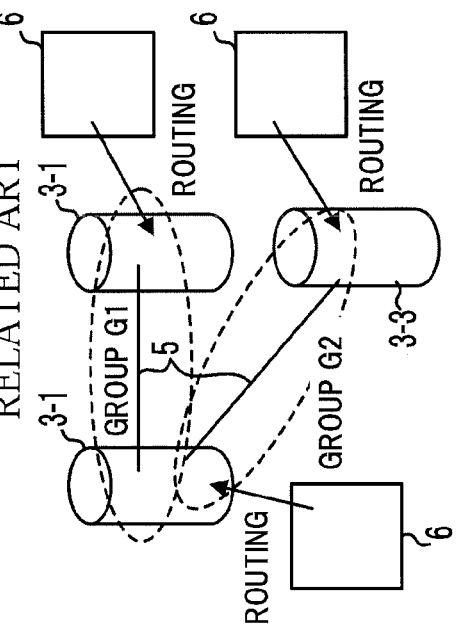
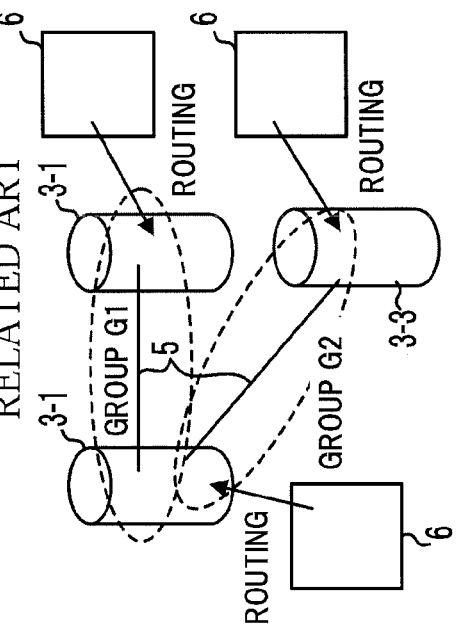
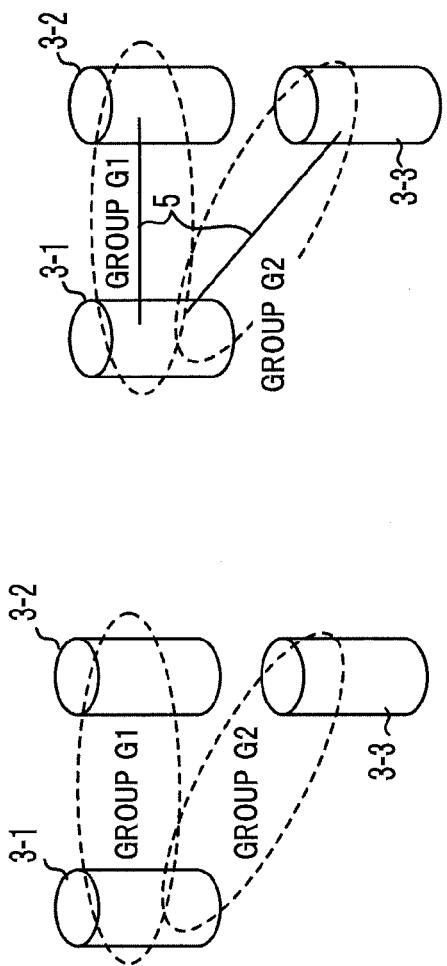
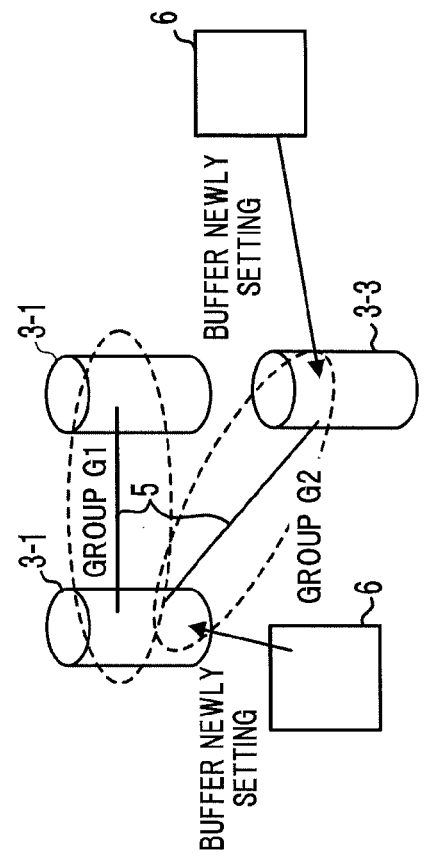
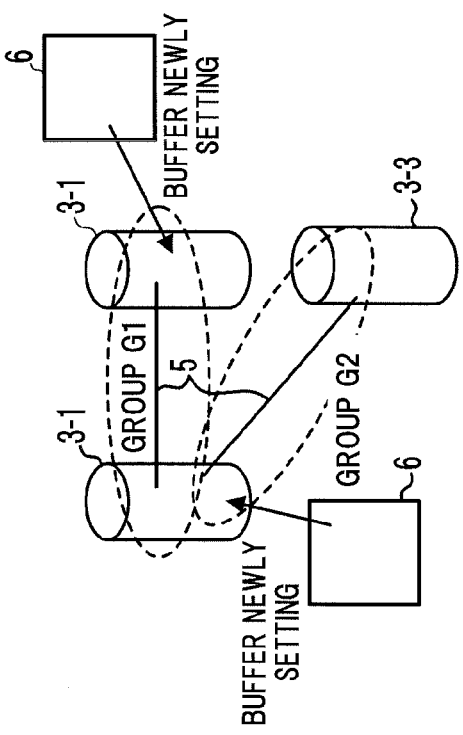

FIG. 4

| NUMBER SGN OF GROUPS TO BE SUBJECTED TO NEWLY SETTING | COUNTERPART DEVICE IDENTIFIER SI1 | REC BUFFER SIZE BS1 | REC BUFFER USAGE BU1 | . . | COUNTERPART DEVICE IDENTIFIER SIn | REC BUFFER SIZE BSn | REC BUFFER USAGE BUn |

FIG. 7

| COMMUNICATION-SOURCE DEVICE IDENTIFIER SIs | REC BUFFER SIZE BS | REC BUFFER USAGE BU |
|---|---|---|

FIG. 10

| |
|---|
| COUNTERPART DEVICE IDENTIFIER SI1 |
| REC BUFFER SIZE BS1 |
| REC BUFFER USAGE BU1 |
| COMMUNICATION SUCCESS/FAILURE DETERMINATION FLAG CJF1 |
| ⋮ |
| COUNTERPART DEVICE IDENTIFIER SIn |
| REC BUFFER SIZE BSn |
| REC BUFFER USAGE BUn |
| COMMUNICATION SUCCESS/FAILURE DETERMINATION FLAG CJFn |

STORAGE APPARATUS AND METHOD MAINTAINING AT LEAST AN ORDER OF WRITING DATA

CROSS-REFERENCE TO RELATED APPLICATIONS

This application is based upon and claims the benefit of priority of the prior Japanese Patent Application No. 2009-065340, filed on Mar. 18, 2009, the entire contents of which are incorporated herein by reference.

FIELD

The embodiments discussed herein relate to a storage apparatus that has a remote copy function, such as remote equivalent copy (REC).

BACKGROUND

Distributed-cache-memory storage apparatuses that support a REC consistency mode function in which order is preserved, which is one type of advanced copy, to perform a backup and mirroring between redundant array of independent disks (RAID) devices have been proposed. Advanced copy indicates the function of copying data of a storage apparatus at a point in time (source volume) and generating another volume (copy volume) within the same storage apparatus.

Remote mirroring may operate in synchronous mode and asynchronous mode. In synchronous mode, no completion acknowledgement to a write request is made until writing of data to a target has been completed. In asynchronous mode, a completion acknowledgement to a write request is made without waiting for the completion of writing of data to a target. Generally, asynchronous mode may be classified into consistency mode for remote mirroring and stack mode for remote backup. In consistency mode, order of writing data is preserved.

REC mode is known in itself. For example, in that mode, mirroring can be performed in accordance with commands, such as Start, Stop, Suspend, Forced Stop, Forced Suspend, and Resume. A Start command causes generation of a mirrored volume and a synchronous process to start. A Stop command causes cancellation of mirroring, discarding a mirrored volume, and transferring all data written before the Stop command is issued to a copy volume until the Stop command ends. A Suspend command causes cancellation of mirroring, maintaining a mirrored volume, and transferring all data written before the Suspend command is issued to a copy volume until the Suspend command ends. The maintained mirrored volume can be resynchronized in response to a Resume command. A Forced Stop command causes cancellation of mirroring and discarding a mirrored volume. It is unnecessary to transfer data written before the Forced Stop command is issued to a copy volume. A Forced Suspend command causes cancellation of mirroring and maintaining a mirrored volume. It is unnecessary to transfer data written before the Forced Suspend command is issued to a copy volume. The maintained mirrored volume can be resynchronized in response to a Resume command. A Resume command causes resynchronization after a Suspend command. The resynchronization is performed by transferring data written in a suspended state.

FIG. 1 illustrates one example of a traditional distributed-cache-memory storage apparatus. In FIG. 1, a storage apparatus 1 includes a copy-source storage device (hereinafter referred to also as a copy-source device) 3-1 and a copy-target storage device (hereinafter referred to also as a copy-target device) 3-2 connected to each other over a network 2. Each of the copy-source device 3-1 and the copy-target device 3-2 can include a plurality of control modules 11, for example. Each of the control modules 11 includes a processor (e.g., a central processing unit (CPU)), a buffer 12 for use in recording, and a disk unit 13.

The storage apparatus 1 illustrated in FIG. 1 performs a process for reading and/or writing (hereinafter referred to simply as reading/writing) logical volume data for each control module 11. For example, like with the REC consistency mode function in which order is preserved, when order of writing data in remote copying in asynchronous mode is preserved, data stored in a disk in the disk unit 13 in the copy-source device 3-1 is stored in the buffer 12 in the copy-source device 3-1, and if the buffer 12 becomes full or a predetermined period of time elapses since storing data is started, the data in the buffer 12 in the copy-source device 3-1 is collectively transmitted to the copy-target device 3-2, which is connected to the copy-source device 3-1 via the network 2. In the copy-target device 3-2, when all data has been received, the data stored in the buffer 12 for use in recording is collectively developed and stored in a disk in the disk unit 13. Accordingly, in order to perform the REC consistency mode function, it is necessary to set the buffer 12 in each of the copy-source device 3-1 and the copy-target device 3-2.

FIGS. 2A, 2B, 2C, 2D and 2E illustrate an example procedure for newly setting a buffer region in the buffer 12 for use in the REC consistency mode. FIG. 2A illustrates a state in which three storage devices 3-1, 3-2 and 3-3 are prepared by way of example to perform the REC consistency mode function. FIG. 2B illustrates a state in which the storage devices 3-1, 3-2 and 3-3 are connected together via a cable or network 5. For the sake of convenience of description, the storage devices 3-1 and 3-2 form a group G1, and the storage devices 3-1 and 3-3 form a group G2. FIG. 2C illustrates a state in which routing by which each of the storage devices 3-1 to 3-3 will be connected to a counterpart storage device is set from a storage management personal computer (PC) 6 for each of the storage devices 3-1 to 3-3. FIG. 2D illustrates a state in which the newly setting of the buffer 12 for the group G1 in order to perform the REC consistency mode function is executed from the storage management PC 6 for each of the storage devices 3-1 and 3-2. FIG. 2E illustrates a state in which the newly setting of the buffer 12 for the group G2 in order to perform the REC consistency mode function is executed from the storage management PC 6 for each of the storage devices 3-1 and 3-3.

In such a way, the newly setting of the buffer 12 is executed in each of the copy-source device 3-1 and the copy-target devices 3-2 and 3-3 from their respective storage management PCs 6. Accordingly, the newly setting of the buffer 12 is executed in each of the copy-source device 3-1 and the copy-target devices 3-2 and 3-3. It is preferable that the copy-source device 3-1 and the copy-target devices 3-2 and 3-3 be connected to their respective storage management PCs 6.

Additionally, it is preferable that, because the newly setting is executed for each of the copy-source device 3-1 and the copy-target devices 3-2 and 3-3, in order to know whether the newly setting of the buffer 12 of a counterpart storage device is correct, the newly setting be checked from the storage management PC 6 for each of the copy-source device 3-1 and the copy-target devices 3-2 and 3-3. That is, the storage management PC 6 connected to the copy-source device 3-1 checks whether the newly setting of the buffer 12 of each of the copy-target devices 3-2 and 3-3, which are counterpart storage devices, is correct. The storage management PC 6 connected to each of the copy-target devices 3-2 and 3-3 checks whether the newly setting of the buffer 12 of the copy-source device 3-1, which is a counterpart storage device, is correct.

A traditional storage apparatus has drawbacks including a problem in that it is difficult to newly set a buffer for use in a function in which order of writing data in remote copying in asynchronous mode is preserved, like, for example, the REC consistency mode function.

SUMMARY

According to an aspect of the invention, a storage system and method thereof are provided. According to an embodiment, the storage system includes a plurality of storage devices connected together, the plurality of storage devices including a copy-source storage device having data to be copied and copy-target storage devices capable of receiving the copied data. The copy-source storage device includes a copy-source controller for checking parameters contained in a buffer newly setting command to determine a group of storage devices to be subjected to a newly setting of a buffer and a copy-target storage device in the group and transmitting the parameters to the specified copy-target storage device. The copy-target storage device includes a copy-target controller for performing a buffer newly setting process in the specified copy-target storage device on the basis of the parameters received from the copy-source storage device and notifying the copy-source storage device of a result of the buffer newly setting process.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed. Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIGS. 2A, 2B, 2C, 2D and 2E illustrate an example procedure for newly setting a buffer region in a buffer for use in the REC consistency mode;

FIG. 4 illustrates one example of parameters of a REC collective buffer newly setting command;

FIG. 7 illustrates one example of parameters acquired in FIG. 6;

FIG. 10 illustrates one example of a REC buffer table;

DETAILED DESCRIPTION

Figure 1:
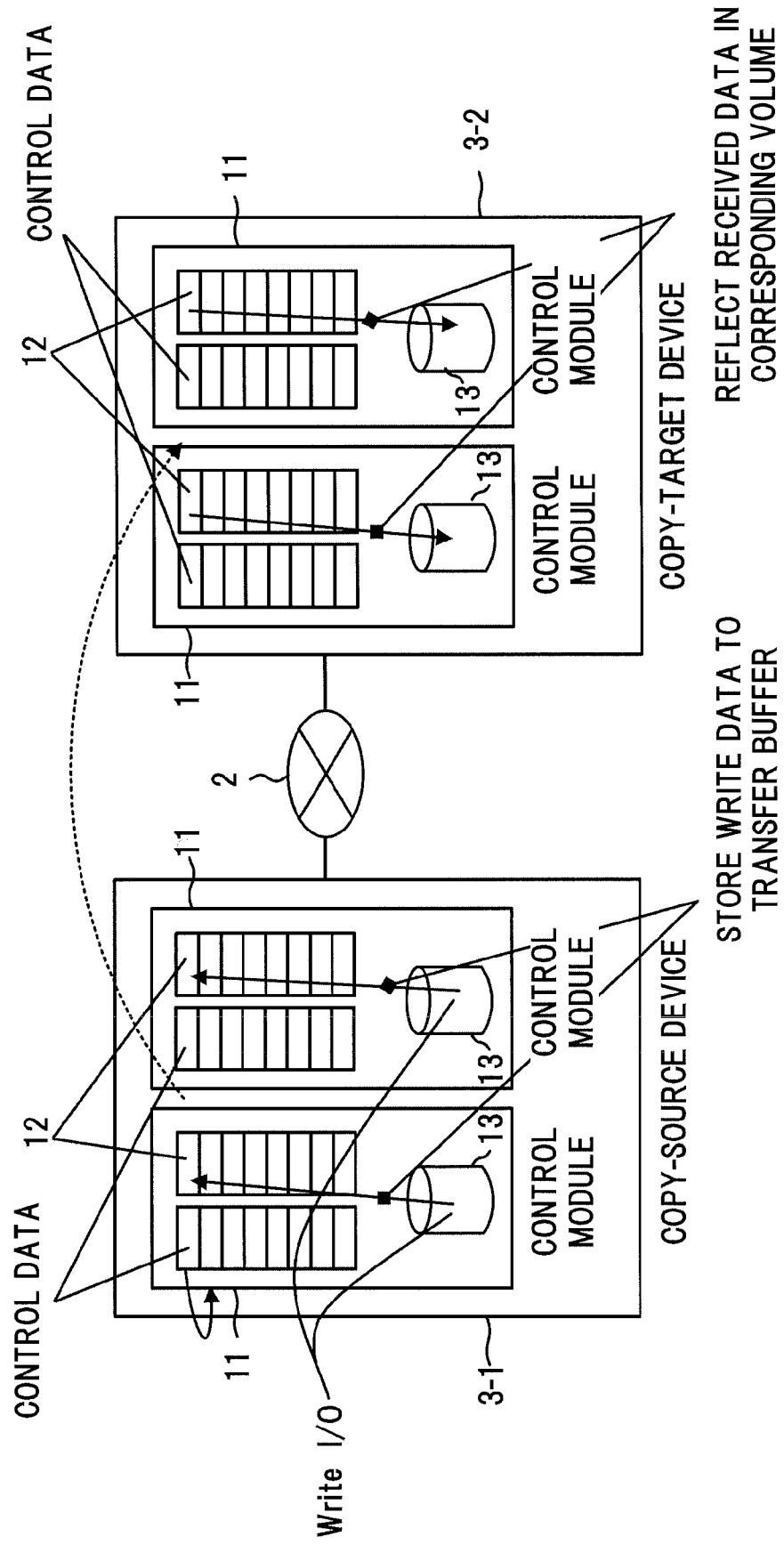
FIG. 1 illustrates one example of a traditional distributed-cache-memory storage apparatus.

Reference will now be made in detail to the embodiments, examples of which are illustrated in the accompanying drawings, wherein like reference numerals refer to the like elements throughout. The embodiments are described below to explain the present invention by referring to the figures.

According to an embodiment, a disclosed storage apparatus is of a distributed cache memory type having a function in which an order of writing data in a remote copying in asynchronous mode is preserved, like, for example, the REC consistency mode function. The storage apparatus includes a plurality of storage devices connected together over a network. A copy-source storage device includes a parameter checking unit contained in a received collective buffer newly setting command to determine a group of storage devices to be subjected to collective buffer newly setting and a specified copy-target storage device in the group, communicating with the specified copy-target storage device, and transmitting parameters to the specified copy-target storage device. The specified copy-target storage device includes setting unit that performs a buffer newly setting process in the specified copy-target storage device on the basis of the parameters transmitted from the copy-source storage device and notifying the copy-source storage device of a result of the buffer newly setting process. The parameters include, for example, a number of groups of storage devices to be subjected to collective buffer newly setting, a device identifier for identifying a copy-target storage device, a buffer size, and a buffer usage indicating that a specified storage device is a copy source or a copy target.

The setting of a buffer for use in performing a function in which an order of writing data in a remote copying in asynchronous mode is preserved, like, for example, the REC consistency mode function, can be achieved by collective newly setting that employs a route for connecting storage devices. In such a way, a function in which an order of writing data in a remote copying in asynchronous mode is preserved, like the REC consistency mode function, can be provided.

Embodiments of the storage apparatus according to the present invention are described below with reference to FIG. 3 and its subsequent drawings.

FIGS. 3A, 3B, 3C and 3D illustrate an example procedure for newly setting a buffer region in a buffer for use in recording in a storage device in a distributed-cache-memory storage apparatus according to an embodiment of the present invention when it is used in the REC consistency mode. A storage apparatus 21 includes a storage device being a copy source having data to be copied (hereinafter referred to also as a copy-source device) 23-1 and one or more storage devices each being a copy target capable of receiving at least part of the copied data (hereinafter referred to also as copy-target devices) 23-2 and 23-3. The copy-source device 23-1 and each of the copy-target devices 23-2 and 23-3 are connected to each other over a network. Each of the copy-source device 23-1 and the copy-target devices 23-2 and 23-3 may include a plurality of control modules, as in the case of FIG. 1, or alternatively, may include a single control module. The control module includes a processor (e.g., CPU), a buffer for use in recording, and a disk unit. The storage devices 23-1 to 23-3 may have different numbers of control modules.

Figure 3A:
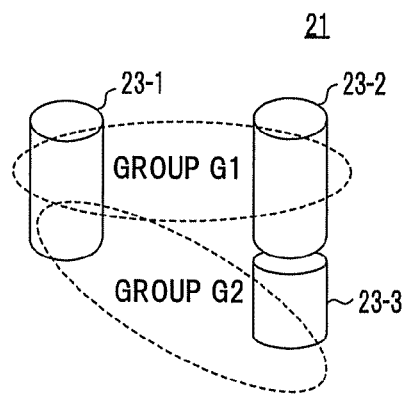
FIGS. 3A, 3B, 3C and 3D illustrate an example procedure for newly setting a buffer region in a buffer for use in the REC consistency mode in a distributed-cache-memory storage apparatus according to an embodiment of the present invention.
Figure 3B:
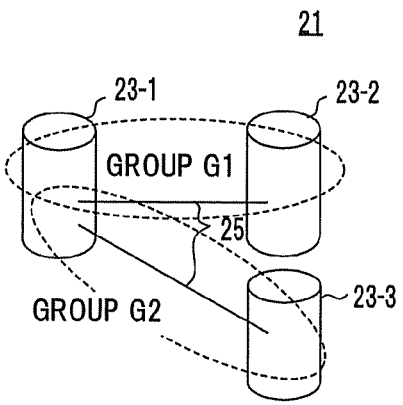
Figure 3C:
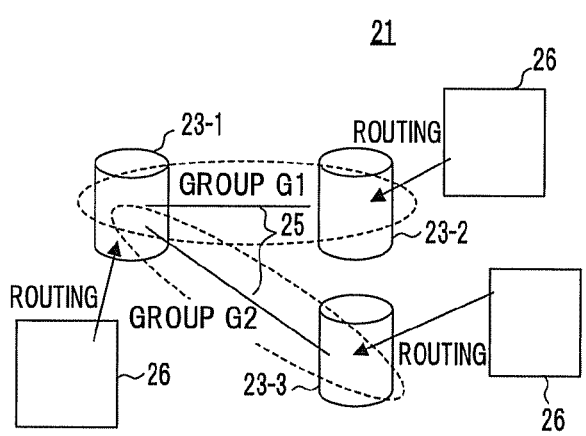
Figure 3D:
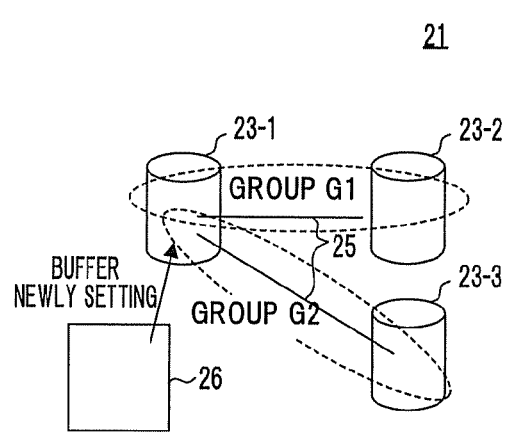

FIG. 3A illustrates a state in which the three storage devices 23-1 to 23-3 are prepared by way of example for performing the REC consistency mode function. FIG. 3B illustrates a state in which the storage devices 23-1, 23-2, 23-3 are connected together via a cable or network 25. For the sake of convenience of description, the storage devices 23-1 and 23-2 form a group G1, and the storage devices 23-1 and 23-3 form a group G2. FIG. 3C illustrates a state in which routing by which each of the storage devices 23-1, 23-2 and 23-3 will be connected to a counterpart storage device is set from a storage management personal computer (PC) 26 for each of the storage devices (hereinafter referred to simply as a storage management PC 26) or a host server (not shown). The storage management PC 26 and the host server may be disposed together. FIG. 3D illustrates a state in which the newly setting of the buffer for each of the plurality of groups G1 and G2 in order to perform the REC consistency mode function is collectively executed from the storage management PC 26 for the storage device 23-1.

In such a way, newly setting of a buffer for one or more of the copy-target devices 23-2 and 23-3 can be executed in a collective manner from the storage management PC 26 for the copy-source device 23-1. Accordingly, the buffer can be newly set without having to execute the newly setting in each of the copy-target devices 23-2 and 23-3. In other words, the setting of the new buffer does not require separate or independent setting of the buffer in each of the devices involved. Also, the buffer can be newly set without having to use the storage management PC 26 connected to each of the copy-target devices 23-2 and 23-3.

In addition, there is no need to check whether the newly setting of the buffer of a counterpart storage device is correct from the storage management PC 26 for the copy-source device 23-1.

In other words, when newly setting a buffer, a storage device communicates with a counterpart storage device via a previously set route between the storage devices, that is, the cable or network 25, so as to execute the newly setting of the buffer of the counterpart storage device in a collective manner. Also, the storage device can have a communication with the counterpart storage device and check a status of the newly setting of the buffer on the basis of a response to that communication.

When a storage device attempts to communicate with a counterpart storage device in order to execute the newly setting of the buffer, if the communication is unsuccessful because of disconnection of the route between the storage devices or power-down of the counterpart storage device and thus the newly setting of the buffer of the counterpart storage device is unsuccessful, the communication failure is stored in the storage device that has attempted the communication and, when the route to the counterpart storage device is restored, communication with the counterpart storage device is automatically established to execute the newly setting of the buffer. In such a way, with a newly setting command to a storage device at one end, the buffers of both of the copy-source and copy-target storage devices can be newly set in a collective manner.

Next, processes ST1, ST2, ST3, ST4, ST5 and ST6 performed by the CPU of the control module of each of the storage devices according to an embodiment are described in detail. The CPU performing the processes ST1, ST2, ST3, ST4, ST5 and ST6 corresponds to a CPU 15 illustrated in FIG. 13, which is described below, and forms means (or functional unit) for performing each of the processes ST1, ST2, ST3, ST4, ST5 and ST6. The process ST1 receives, in a storage device, an instruction to execute buffer newly setting (setting of a new buffer) in a collective manner from the storage management PC 26 (hereinafter referred to as a REC collective buffer newly setting command). The process ST2 checks parameters contained in the REC collective new buffer setting command received in the storage device including to determine a group to be subjected to newly setting and a counterpart storage device and communicates with the specified counterpart storage device. The process ST3 executes collective buffer newly setting on the specified counterpart storage device on the basis of the REC collective buffer newly setting command. The process ST4 determines in the storage device whether communication with the specified counterpart storage device is successful or not. The process ST5 executes collective buffer newly setting on a plurality of groups by the storage device that has received the REC collective buffer newly setting command. The process ST6 automatically resuming the newly setting of the buffer when the route is restored after communication between the storage devices is unsuccessful.

In the process ST1, a communication-source (e.g., copy-source) storage device receives a REC collective buffer newly setting command for executing collective buffer newly setting from the storage management PC 26. When the process ST1 is completed, the process proceeds to the process ST2, which is described below.

FIG. 4 illustrates one example of parameters of the REC collective buffer newly setting command (collectively setting a new buffer). As illustrated in FIG. 4, the parameters include the number SGN of groups to be subjected to newly setting, the device identifiers SI1 to SIn of counterpart storage devices (n is a natural number more than one), REC buffer sizes BS1 to BSn, and REC buffer usages BU1 to BUn. The number SGN of groups to be subjected to newly setting indicates the number of groups to be subjected to collective buffer newly setting in response to a received REC collective buffer newly setting command. Each of the device identifiers SI1 to SIn of counterpart storage devices indicate the identifier for identifying a storage device that is a counterpart of a pair to be subjected to collective buffer newly setting and is acquired from routing information set in a storage portion in a buffer or a disk unit in the storage device. The routing information is information that indicates the above routing. The REC buffer sizes B81 to BSn each indicate the size of a buffer to be used. The REC buffer usages BU1 to BUn each indicate that a specified storage device is a storage device that is to transmit data (i.e., a communication-source or copy-source storage device) or a storage device that is to receive data (i.e., a communication-target or copy-target storage device). While specific parameters are shown in FIG. 4, the present invention is not limited to any particular parameters.

In the process ST2, the parameters of the REC collective buffer newly setting command received by the communication-source storage device in the process ST1 are checked through a parameter checking process to determine a group of storage devices to be subjected to collective buffer newly setting and a counterpart storage device, and communication with the specified counterpart storage device is executed in a communication process. The process ST2 is performed on each counterpart storage device in the group.

Figure 5:
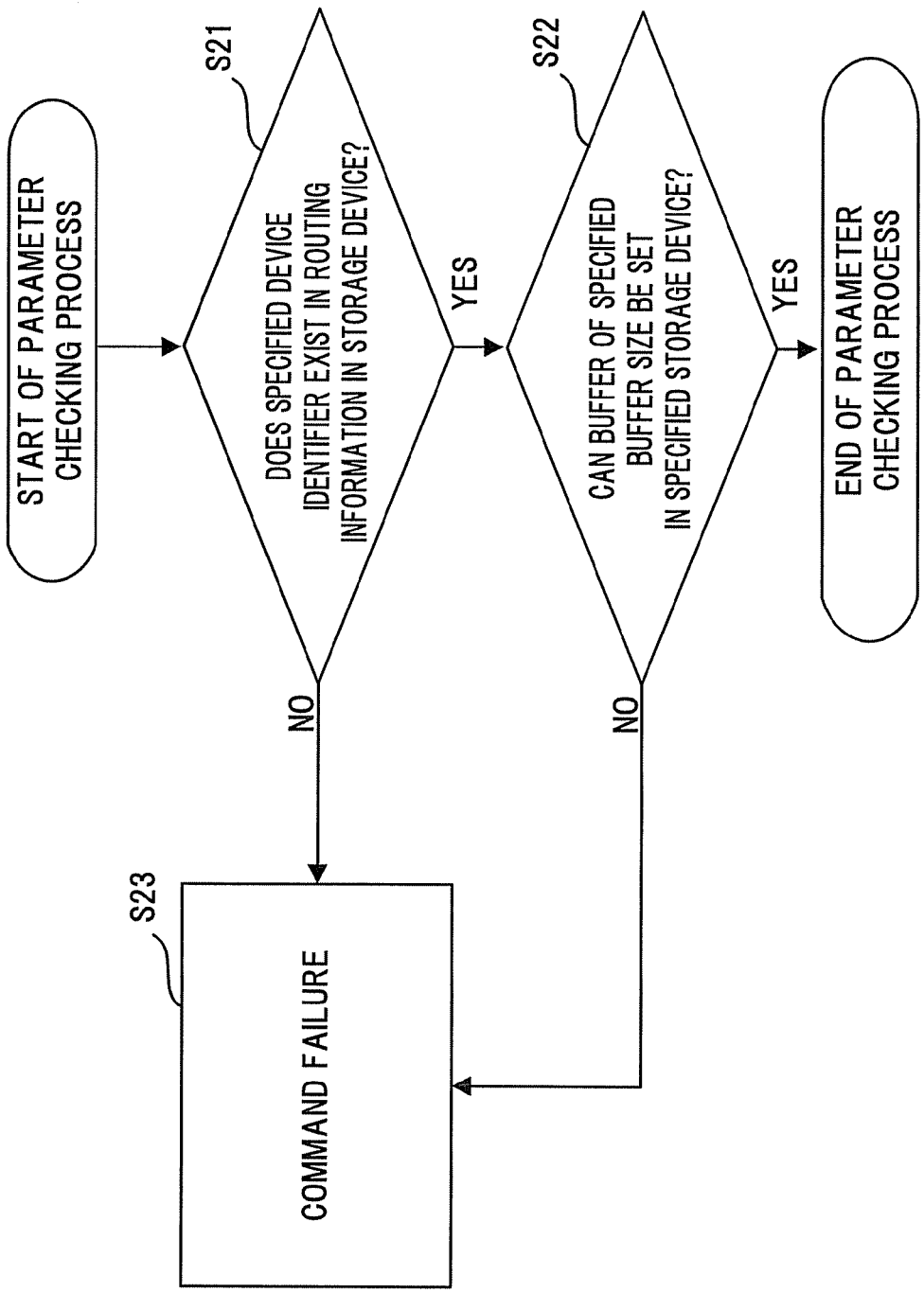
FIG. 5 is a flowchart describing a parameter checking process.

FIG. 5 is a flowchart describing a parameter checking process. In FIG. 5, in operation S21, it is determined from parameters of the REC collective buffer newly setting command received in the process ST1 by the communication-source storage device whether the device identifier SI of the specified counterpart storage device (e.g., copy-target storage device) exists in routing information set in a storage portion in the storage device that has received the REC collective buffer newly setting command. If the determination in operation 821 is YES, it is determined in operation S22 whether the buffer of the buffer size specified in the REC buffer size BS can be newly set in the specified counterpart storage device. If the determination in operation S22 is YES, the parameter checking process is completed and the flow proceeds to the communication process, which is described below with reference to FIG. 6. If the determination in operation S21 or S22 is NO, it is determined in operation S23 that the execution of the REC collective buffer newly setting command is unsuccessful, and the storage management PC 26 of the communication-source storage device, in this case, being the issuer of the REC collective buffer newly setting command is notified of a command failure indicating that there is no routing information on the specified counterpart storage device (NO in S21) or that acquirement of the buffer of the specified buffer size is unsuccessful (NO in S22).

Figure 6:
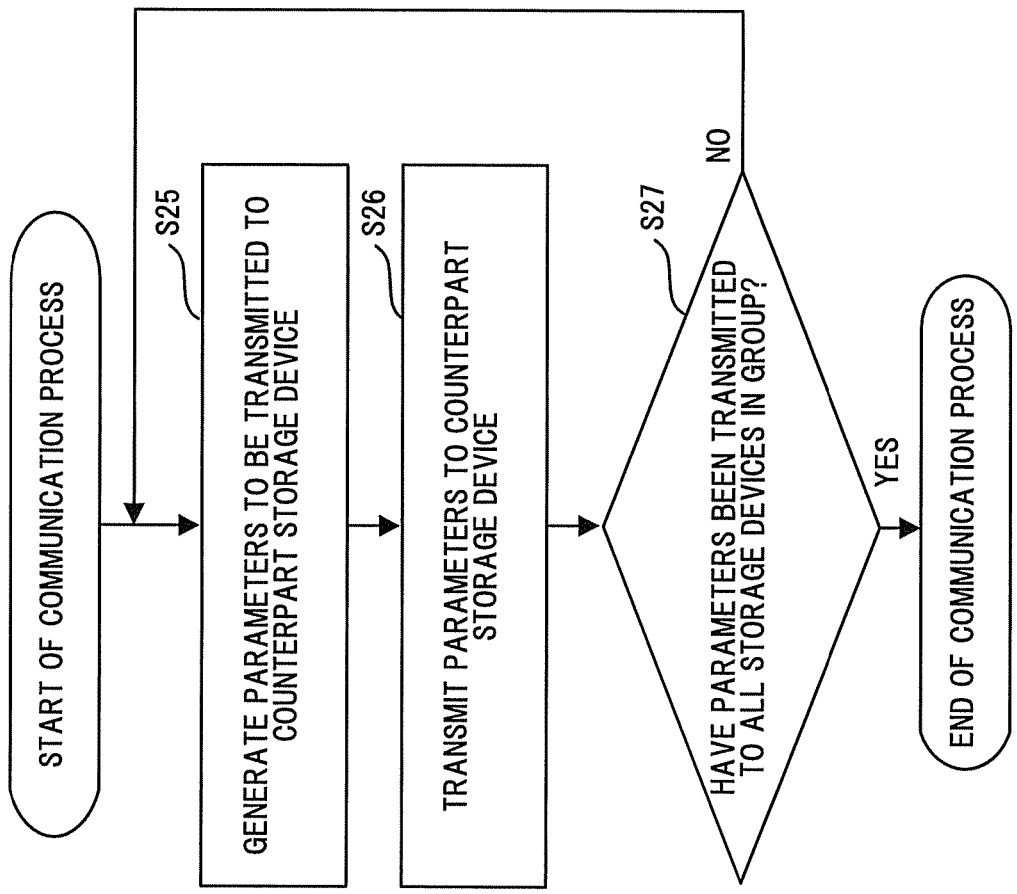
FIG. 6 is a flowchart describing a communication process.

FIG. 6 is a flowchart describing a communication process. In FIG. 6, in operation S25, the communication-source storage device generates parameters to be transmitted to each counterpart storage device on the basis of the parameters specified in the REC collective buffer newly setting command and the routing information set in the storage portion in the storage device that has received the REC collective buffer newly setting command.

FIG. 7 illustrates one example of the parameters acquired in operation S25. As illustrated in FIG. 7, the acquired parameters include a device identifier SIs of the communication-source storage device (hereinafter referred to as the communication-source device identifier), REC buffer size BS, and REC buffer usage BU. The communication-source device identifier SIs indicates an identifier for indentifying the communication-source storage device and is set based on the routing information set in the storage portion in the storage device that has received the REC collective buffer newly setting command. The REC buffer size BS indicates the buffer size to be used. The REC buffer usage BU indicates that the specified counterpart storage device is at the transmission side or reception side. While specific parameters are shown with respect to FIG. 7, the present invention is not limited to any particular parameter and may include any data necessary for implementing transmission.

Referring back to FIG. 6, in operation S26, the acquired parameters are transmitted to the counterpart storage device. In operation S27, it is determined whether the parameters have been transmitted to all storage devices in the group to be subjected to collective buffer newly setting. If the determination in operation S27 is NO, flow returns to operation S25; if the determination is YES, the communication process is completed, and flow proceeds to the process ST3, which is described below.

In the process ST3, a buffer newly setting process is performed in the specified counterpart storage device, that is, the communication-target (e.g., copy-target) in accordance with the specified parameters. The process ST3 is performed in each counterpart storage device in the group.

Figure 8:
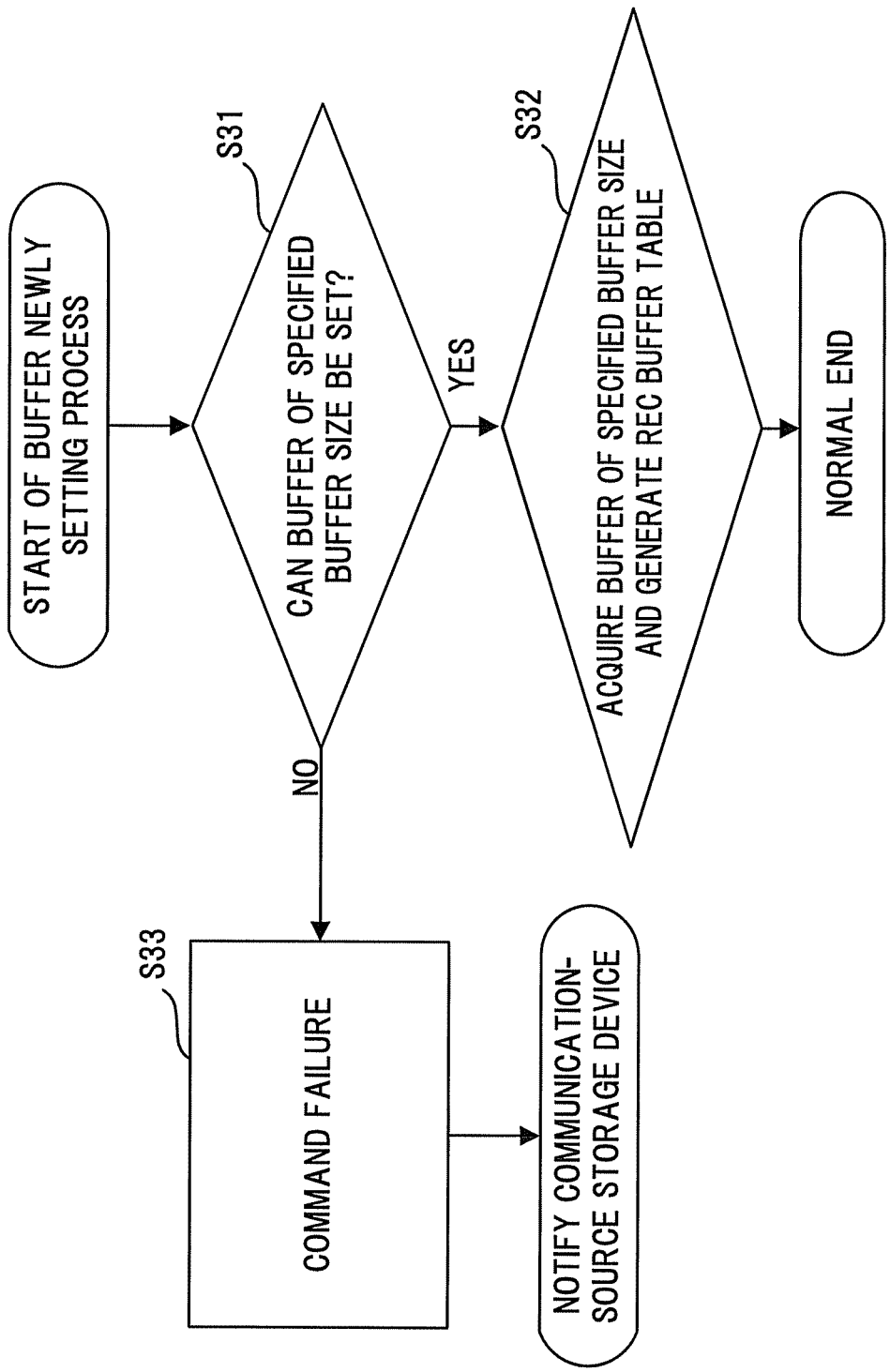
FIG. 8 is a flowchart describing a process ST3.

FIG. 8 is a flowchart describing the process ST3. In FIG. 8, in operation S31, it is determined whether a buffer of the buffer size specified in the REC buffer size BS can be newly set in the specified counterpart storage device. If the determination in S31 is YES, in operation S32, the buffer of the buffer size specified in the REC buffer size BS is acquired in the specified counterpart storage device, and a REC buffer table that contains information on the acquired buffer is generated and stored in the storage portion in the specified counterpart storage device. Then, the communication-source storage device is notified of normal end. The REC buffer table is described below. After operation S32, the process ST3 is completed, and flow proceeds to the process ST4, which is described below with reference to FIG. 9.

If the determination in operation S31 is NO, it is determined in operation S33 that the execution of the REC collective buffer newly setting command is unsuccessful in the specified counterpart storage device, and the issuer of the REC collective buffer newly setting command, that is, the storage management PC 26 for the communication-source storage device is notified of a command failure indicating that the acquirement of the buffer of the specified buffer size is unsuccessful.

In the process ST4, it is determined in a communication success/failure determination process whether communication between the communication-source storage device and the specified counterpart storage device (or the communication-target storage device) is successful or not. The process ST4 is performed on each counterpart storage device in the group.

Figure 9:
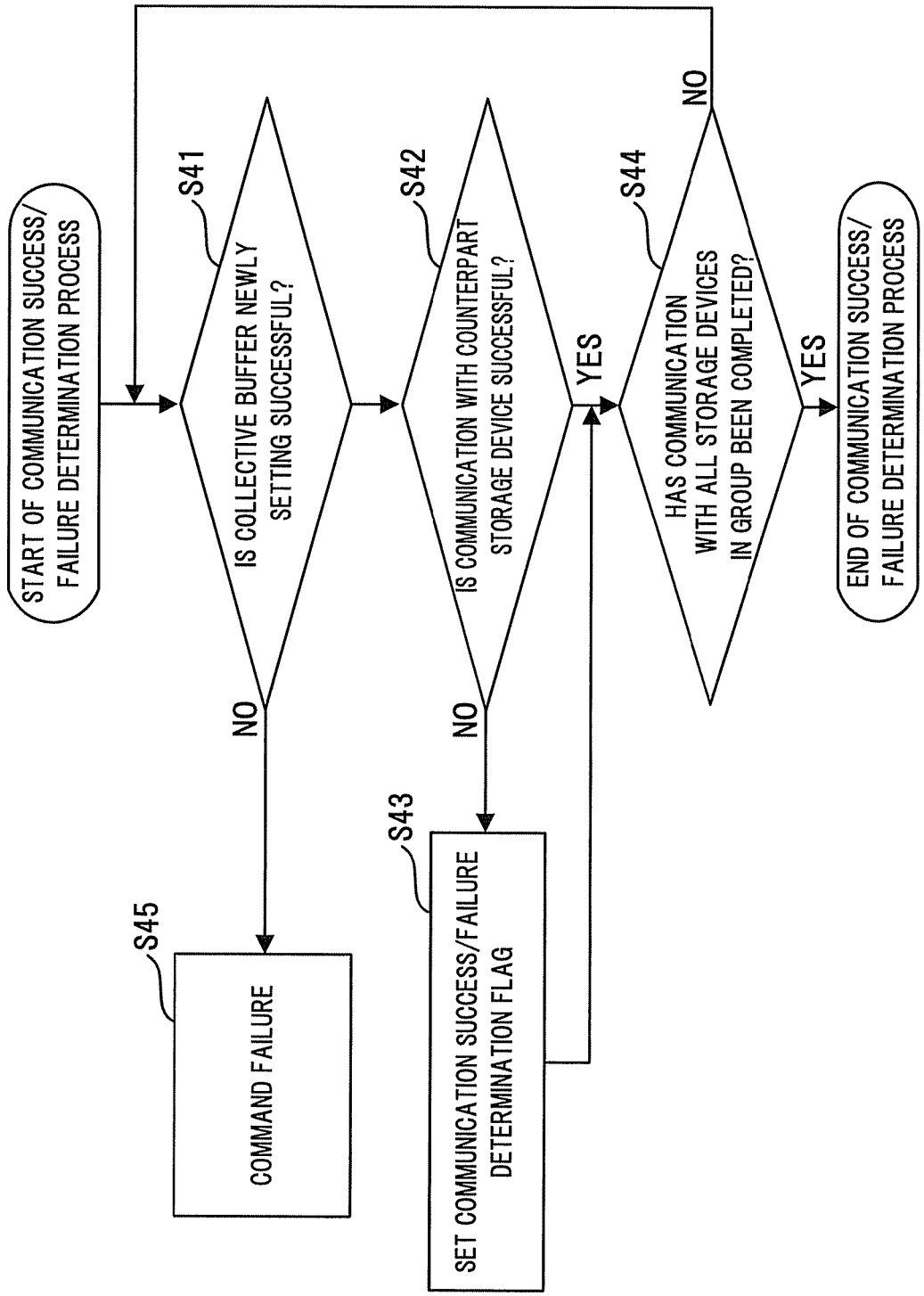
FIG. 9 is a flowchart describing a process ST4.

FIG. 9 is a flowchart describing the process ST4. In FIG. 9, in operation S41, it is determined in the communication-source storage device whether the collective buffer newly setting executed on the counterpart storage device is successful. If there is no notification of command failure and the determination in operation S41 is YES, in operation S42, it is determined in the communication-source storage device whether communication with the counterpart storage device is successful. If there is no notification of normal end of the process ST3 from the counterpart storage device and the determination in operation S42 is NO, in operation S43, a communication success/failure determination flag (CJF) indicating communication failure is set in the REC buffer table, and the process proceeds to operation S44.

If notification of normal end of the process ST3 is provided from the counterpart storage device and the determination in operation S42 is YES or after operation S43, it is determined in operation S44 whether communication with all storage devices in the group of storage devices subjected to the collective buffer newly setting is completed. If the determination in operation S44 is NO, flow returns to operation S41; if the determination is YES, the process ST4 is completed, and flow proceeds to the process ST5, which is described below.

If command failure indicating that the acquirement of the buffer of the specified buffer size is unsuccessful is provided from the counterpart storage device and the determination in operation S41 is NO, it is determined in operation S45 that the execution of the REC collective buffer newly setting command is unsuccessful, and the storage management PC 26 for the communication-source storage device being the issuer of the REC collective buffer newly setting command is notified of the command failure.

FIG. 10 illustrates one example of the REC buffer table. As illustrated in FIG. 10, the REC buffer table contains the device identifiers SI1 to SIn of counterpart storage devices, REC buffer sizes BS1 to BSn, REC buffer usages BU1 to BUn, and communication success/failure determination flag CJF1 to CJFn. In the present embodiment, when no notification of normal end is provided from the counterpart storage device, the communication success/failure determination flag CJF indicating communication failure is set. Alternatively, of course, when notification of normal end is provided from the counterpart storage device, the communication success/failure determination flag CJF indicating communication success may be set. In other words, any form can be used as long as a communication success/failure determination flag CJF indicates that the communication is successful or not.

In the process ST5, a communication-source storage device that has received a REC collective buffer newly setting command performs a collective buffer newly setting process on a plurality of groups. The process ST5 is performed on each counterpart storage device in the groups.

Figure 11:
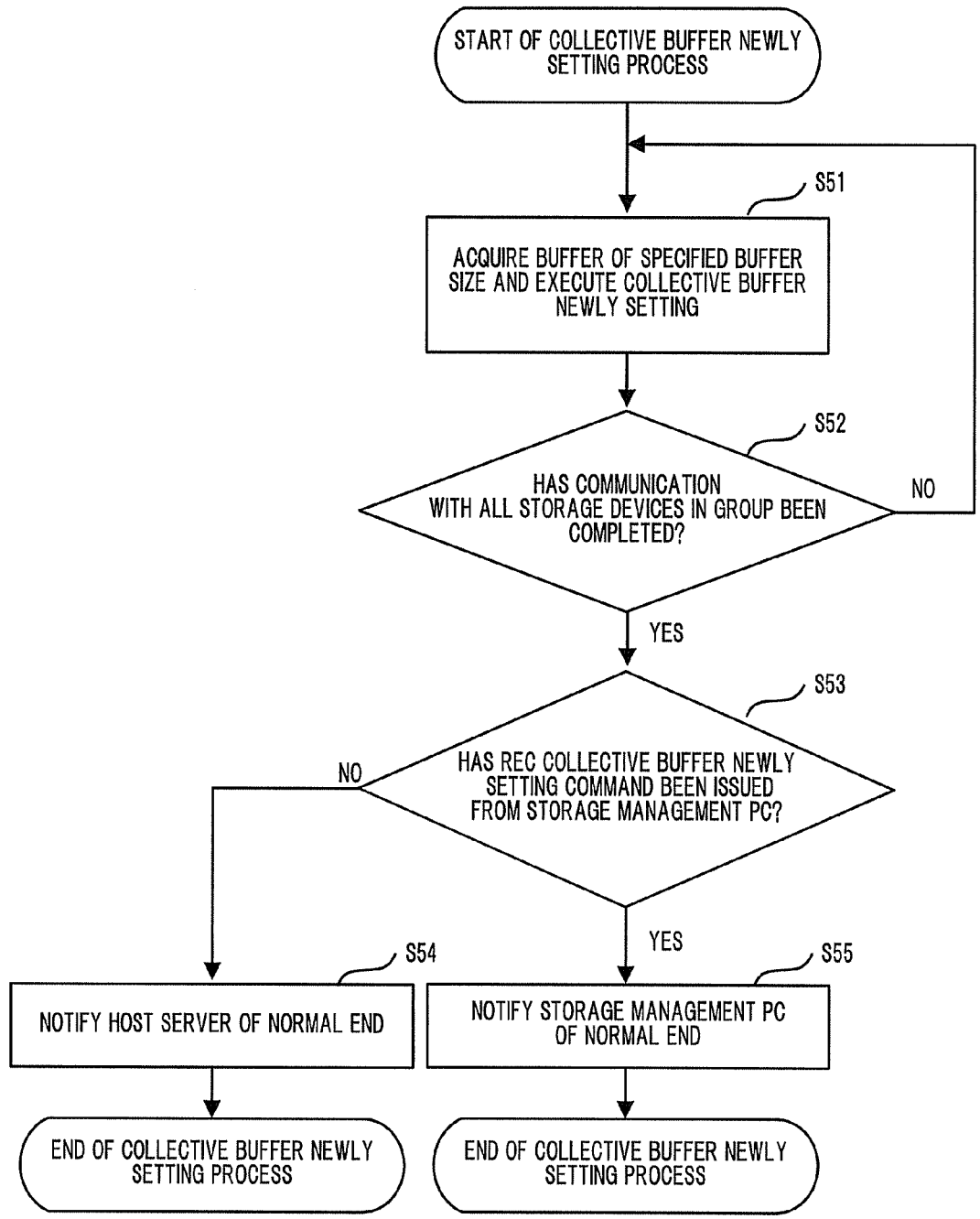
FIG. 11 is a flowchart describing a process ST5.

FIG. 11 is a flowchart describing the process ST5. In FIG. 11, in operation S51, the communication-source storage device executes collective buffer newly setting by storing information on a buffer of a specified buffer size acquired from each counterpart storage device in a REC buffer table corresponding to the number SGN of groups to be subjected to newly setting. The information on the buffer of the specified buffer size stored in the REC buffer table corresponding to each group to be subjected to newly setting includes the device identifiers SI1 to SIn of the counterpart storage devices, REC buffer sizes BS1 to BSn, REC buffer usages BU1 to BUn, and communication success/failure determination flags CJF1 to CJFn. In operation S52, it is determined whether communication with all storage devices in all groups has been completed. If the determination in operation S52 is NO, flow returns to operation 551; if the determination is YES, flow proceeds to operation S53.

In operation S53, it is determined whether the issuer of the REC collective buffer newly setting command is the storage management PC 26. For example, when the communication-source storage device is provided with the storage management PC 26 and is also connected to a host server, if the issuer of the REC collective buffer newly setting command is the storage management PC 26, the determination in operation S53 is YES; if the issuer is the host server, the determination in operation S53 is NO. If the determination in operation S53 is NO, in operation S54, the host server is notified of normal end of the collective buffer newly setting, and the process ST5 is completed. In contrast, if the determination in operation S53 is YES, in operation S55, the storage management PC 26 is notified of normal end of the collective buffer newly setting, and the process ST5 is completed.

The process ST6 is a route open process for, when a route is restored after communication between storage devices is unsuccessful because of a blockage occurring in the route, automatically resuming collective buffer newly setting and corresponds to a modified example of the communication process illustrated in FIG. 6. Operations S61, S62 and S63 and S65, S66, S67, S68 and S69 in the process ST6 are performed on each counterpart storage device in a group, whereas operation S64 is not required to be performed in each counterpart storage device in the group. For the sake of convenience of description, if collective buffer newly setting for a counterpart (communication-target) storage device by the communication-source storage device is unsuccessful because of a blockage occurring in the route between the communication-source storage device and the counterpart storage device, a blockage flag indicating the blockage occurring in the route is set in the storage portion in the communication-source storage device. The blockage flag may be set in the REC buffer table, which is described above with reference to FIG. 10, in a similar manner to the communication success/failure determination flags CJF1 to CJFn.

Figure 12:
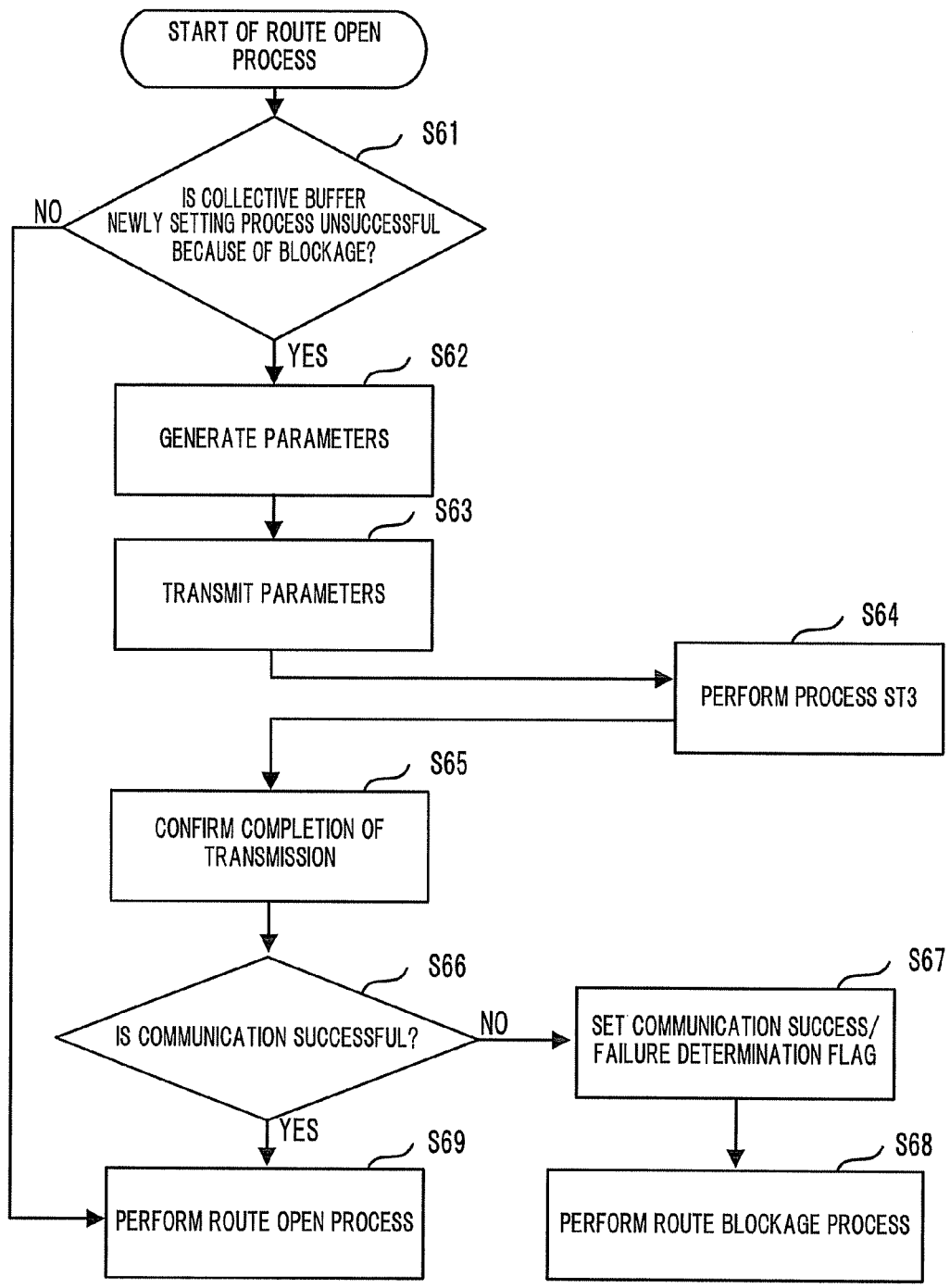
FIG. 12 is a flowchart describing a process ST6.

FIG. 12 is a flowchart describing the process ST6. In FIG. 12, in operation S61, it is determined on the basis of a blockage flag whether communication with the counterpart storage device is unsuccessful because of a blockage occurring in the route to that counterpart storage device. If the determination in operation S61 is YES, in operation S62, parameters to be transmitted to the counterpart storage device are generated in a similar manner to operation S25 in FIG. 6. In operation S63, the generated parameters are transmitted to the counterpart storage device in a similar manner to operation S26 in FIG. 6.

In operation S64, a buffer newly setting process similar to the process ST3 illustrated in FIG. 8 is performed in the counterpart storage device.

In operation S65, the communication-source storage device confirms the completion of transmission to the counterpart storage device. In operation S66, it is determined whether communication with the counterpart storage device is successful in a similar manner to operation S42 in FIG. 9. If the determination in operation S66 is NO, in operation S67, a communication success/failure determination flag CJF indicating a communication failure is set in the REC buffer table, and flow proceeds to operation S68. In operation S68, a route blockage process for setting a blockage flag to the route to the counterpart storage device for which the communication success/failure determination flag CJF is set is performed.

If the determination in operation S61 is NO or if the determination in operation S66 is YES, flow proceeds to operation S69. In operation S69, a route open process for removing a blockage flag from the route to the counterpart storage device is performed.

In such a way, when, in the process ST3, communication with the counterpart storage device in each group is unsuccessful because of a blockage occurring in the route to the counterpart storage device and then the route is opened, if buffer newly setting is unsuccessful because of the blockage occurring in the route during the collective buffer newly setting performed on the counterpart storage device, the collective buffer newly setting can be restarted by extension of the route open process.

Figure 13:
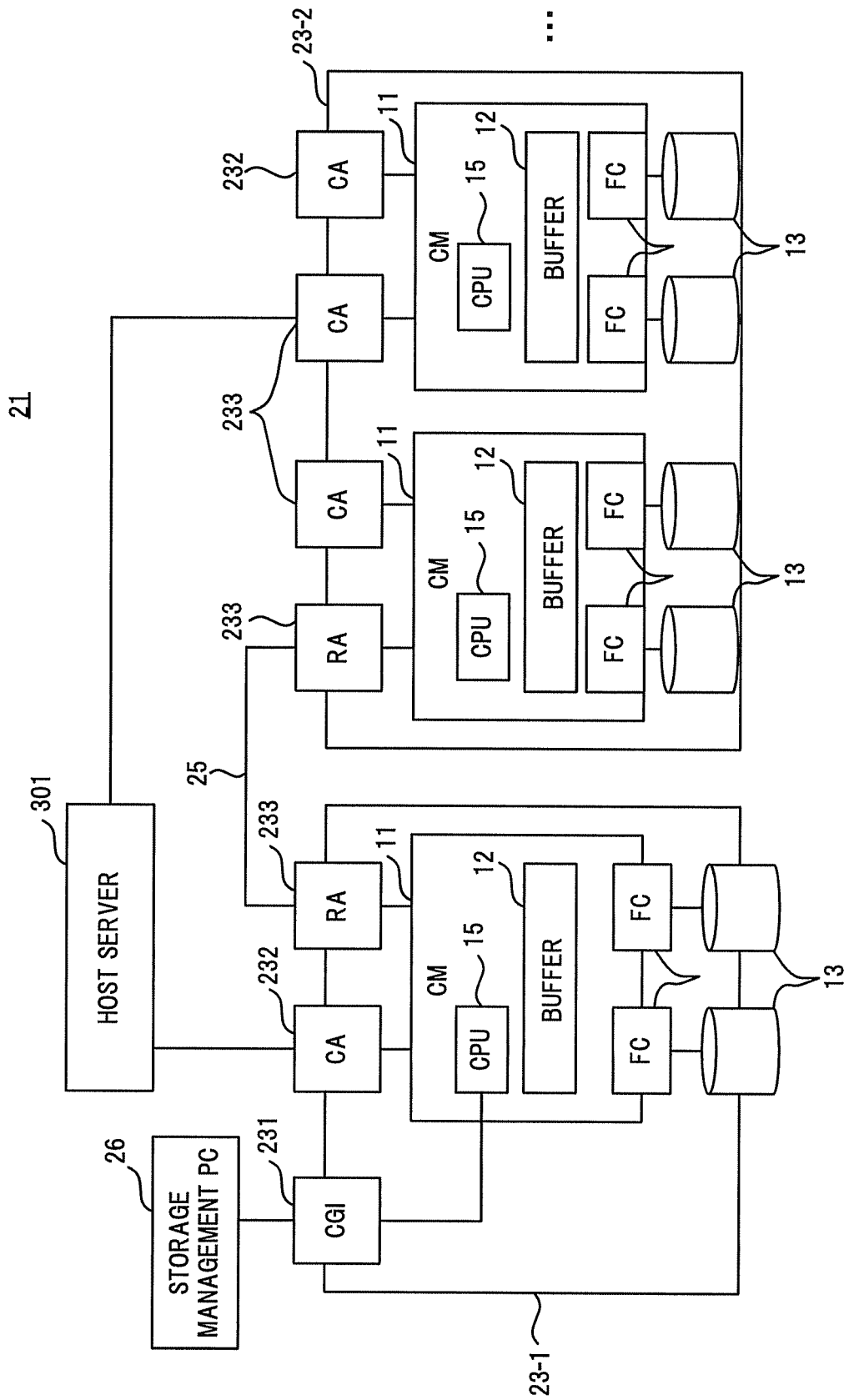
FIG. 13 illustrates one example of a hardware configuration of a storage apparatus.

FIG. 13 is a block diagram that illustrates one example of a hardware configuration of the storage apparatus 21. In FIG. 13, the same reference numerals are used in the same components as in FIGS. 1 and 3, and description thereof is not repeated here. In the example illustrated in FIG. 13, the copy-source storage device 23-1 includes a single control module (CM) 11, and the copy-target storage device 23-2 includes two CMs 11. However, as previously described, the number of CMs 11 is not limited to these numbers. For the sake of convenience of description, only the storage management PC 26 for the storage device 23-1 is illustrated. A host server 301 may form part of the storage apparatus 21, or alternatively, may also be externally connected to the storage apparatus 21. The host server 301 may also be a general-purpose computer.

The storage device 23-1 includes, in addition to the CM 11 and disk units 13, a common gateway interface (CGI) 231 forming an interface controller between the storage management PC 26 and the storage device 23-1, a cannel adapter (CA) 232 forming an interface controller between the storage device 23-1 and the host server 301, and a remote adapter (RM) 233 forming an interface controller between the storage device 23-1 and the storage device 23-2. The CM 11 includes, in addition to a buffer (or cache memory) 12, the CPU 15 and fiber cannels (FCs) 16. The FCs 16 form an interface controller between the CM 11 and each of the disk units 13. Although not illustrated, a memory for storing a REC buffer table may be disposed within or outside the CM 11.

The storage device 23-2 has basically the same configuration as in the storage device 23-1, except that the storage device 23-2 includes the two CMs 11. It is to be noted that the storage management PC 26 for the storage device 23-2 is not illustrated in FIG. 13 because buffer newly setting can be executed without having to use the storage management PC 26 for the storage device 23-2.

The disk unit 13 is not limited to a magnetic disk unit. For example, it may also be an optical disk unit or a magneto-optical disk unit. Instead of the disk unit 13, a recording unit that employs various kinds of recording medium can be used. While specific components are shown FIG. 13, the present invention is not limited to any particular number or type of elements.

Moreover, the embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention, the scope of which is defined in the claims and their equivalents.

What is claimed is:

1. A distributed-cache-memory storage system in which an order of writing data in a remote copying in an asynchronous mode is preserved, the distributed-cache-memory storage system comprising:
   a plurality of storage devices connected together over a network, the plurality of storage devices including a copy-source storage device being a copy source having data to be copied and one or more copy-target storage devices being a copy target capable of receiving at least part of the data to be copied, and
   wherein the copy-source storage device includes a copy-source controller for checking parameters contained in a buffer newly setting command to determine a group of storage devices, including the copy-source storage device, to be subjected to a newly setting of a buffer and a specified copy-target storage device in the group and transmitting the parameters to the specified copy-target storage device,
   wherein the buffer newly setting command is collectively distributed, upon execution of a buffer newly setting process in the copy-source storage device, to the specified copy-target storage device based on a grouping associated with the parameters received in the buffer newly setting command and notifying the copy-source storage device of a result of the buffer newly setting process,
   wherein the parameters include identification of a number of groups of storage devices, which include the copy-source storage device, to be collectively subjected to the buffer newly setting command, a device identifier identifying each of the copy-target storage devices, a buffer size, and a buffer usage indicating that a storage device identified by the device identifier is the copy source or the copy target, and
   wherein the copy-source storage device performs the buffer newly setting process on a plurality of groups in a collective manner.

2. The storage system according to claim 1, wherein the buffer newly setting command is issued from a computer that exists in the copy-source storage device or that is externally connected to the copy-source storage device.

3. The storage system according to claim 1, wherein the copy-source storage device makes a determination whether communication with the specified copy-target storage device is successful and stores a communication success/failure determination flag that indicates a result of the determination in a buffer table that stores at least part of the parameters.

4. The storage system according to claim 1, wherein the copy-source storage device resumes the buffer newly setting process when a route is restored after a communication with the specified copy-target storage device is unsuccessful because of a blockage occurring in the route.

5. The storage system according to claim 1, wherein the copy-target storage device acquires a buffer based on the parameters, generates a buffer table that contains information on the acquired buffer, stores the buffer table in a storage portion in the specified copy-target storage device, and notifies the copy-source storage device of a normal end of the buffer newly setting process.

6. A storage device in a distributed-cache memory-storage system in which an order of writing data in a remote copying in an asynchronous mode is preserved, the storage device comprising:
   a controller configured to:
      check parameters contained in a received buffer newly setting command to determine a group of storage devices, including a copy-source storage, to be subjected to a newly setting of a buffer executed in a collective manner and a specified copy-target storage device in the group and communicating with the specified copy-target storage device to transmit the parameters to the specified copy-target storage device, and
      to receive notification of a result of a buffer newly setting process collectively distributed to, upon execution of the buffer newly setting process in the copy-source storage, the specified copy-target storage device based on a grouping associated with the parameters in received buffer newly setting command,
   wherein the parameters include identification of a number of groups of storage devices, which include the copy-source storage, to be collectively subjected to a buffer newly setting command, a device identifier for identifying the copy-target storage device, a buffer size, and a buffer usage indicating that a storage device identified by the device identifier as the copy source storage having data to be copied or a copy target capable of receiving at least part of the copied data, and wherein the copy-source storage performs the buffer newly setting process on a plurality of groups in a collective manner.

7. A computer-implemented method, comprising:

sending a command having parameters for setting a new region for a buffer to one of storage devices in a group including a source storage; and collectively distributing, upon execution of the command in the source storage, the command for the setting of the new region in the source storage to each of multiple target storage devices based on groupings associated with the parameters identified in the command, and wherein the parameters include identification of a number of groups of storage devices, which include the source storage, to be collectively subjected to the command.

8. The computer-implemented method according to claim 7, wherein said distributing is executed using routing information set in a storage device that received the command.

9. The computer-implemented method according to claim 7, wherein the command, executed in accordance with the parameters, is a single command executed in the source storage.

* * * * *